United States Patent [19]

Nijhuis

[11] Patent Number: 4,561,149
[45] Date of Patent: Dec. 31, 1985

[54] METHOD OF INFLUENCING THE QUALITY, IN PARTICULAR THE TENDERNESS OF MEAT OF SLAUGHTERED ANIMALS BY MEANS OF AN ELECTRIC CURRENT

[75] Inventor: Johan W. Nijhuis, Winterswijk, Netherlands

[73] Assignee: Machinefabriek G. J. Nijhuis B.V., Netherlands

[21] Appl. No.: 293,883

[22] Filed: Aug. 18, 1981

[30] Foreign Application Priority Data

Aug. 19, 1980 [NL] Netherlands ........................ 8004689

[51] Int. Cl.⁴ ............................................... A22C 9/00
[52] U.S. Cl. ........................................ 17/45; 17/1 E; 17/25
[58] Field of Search ............................. 17/25, 45, 1 E

[56] References Cited

U.S. PATENT DOCUMENTS 2,544,681 3/1951 Harsham et al. ................. 17/1 E X
2,544,724 3/1951 Rentschler ........................ 17/1 E X
4,358,872 11/1982 Vanzandt ............................ 17/25 X

FOREIGN PATENT DOCUMENTS 1478258 6/1977 United Kingdom ............... 17/25 X
0640728 1/1979 U.S.S.R. ................................ 17/1 E

*Primary Examiner*—Willie G. Abercrombie
*Attorney, Agent, or Firm*—Arnold, White & Durkee

[57] ABSTRACT

The present invention relates to a method for improving the tenderness of the meat of slaughter cattle by means of an electric current, which current according to the invention is passed through the animal during at least part of the time following the stunning and ending with the clinical death of the animal which electric stimulating current can be applied by the stunning electrodes after the stunning, by separate electrodes in the conveyor, by the conveyor parts itself or by the knife for stabbing the animal, which electric stimulation can be done before the bleeding starts, during the bleeding or even when the bleeding is almost finished.

14 Claims, No Drawings

METHOD OF INFLUENCING THE QUALITY, IN PARTICULAR THE TENDERNESS OF MEAT OF SLAUGHTERED ANIMALS BY MEANS OF AN ELECTRIC CURRENT

This application discloses subject matter related to application Ser. No. 299,541, filed Sept. 4, 1981, which is a continuation-in-part of application Ser. No. 202,322, filed Oct. 30, 1980, which is a continuation of application Ser. No. 905,371, filed May 12, 1978, now abandoned; this application also discloses subject matter related to application Ser. No. 161,298, filed June 20, 1980, application Ser. No. 147,826, filed May 8, 1980, application Ser. No. 147,827, filed May 8, 1980, application Ser. No. 148,033, filed May 8, 1980, and application Ser. No. 148,034, filed May 8, 1980.

The invention relates to a method for influencing the quality and in particular the tenderness of the meat of slaughtered animals by means of an electric current. In the past, a method for influencing the tenderness of meat has been used for a very long time under the name "electrostimulation". Electrostimulation results in a faster decrease of the pH in the meat and an acceleration of the rigor mortis. Electrostimulation influences the progress of postmortal biochemical processes in the muscle tissue of the killed animal. Prior art literature may teach that the effect of the electrostimulation is best when the nerve tracks of the slaughtered animal still have the possibility to transfer stimulation. It has been generally thought that electrostimulation has the best effect shortly after death, and this effect decreases the later electrostimulation is applied. For electrostimulation use is made of direct current or alternating current, and voltages are used between 20 to 3600 Volt, frequencies of 10 to 50 Hz are used and strength of current 0.1 to 6 amperes are used. The later one starts with the electrostimulation the more current one needs.

With fast cooling of the meat prior to the completion of rigor mortis at temperatures below 10° C., the muscles of the slaughtered animal typically contract with the disadvantageous effect of making the meat tough. This may happen as well at relatively high temperatures (above 20° C.). Contraction or shortening of the muscle tissue may amount to 50%. The result is that the meat becomes very tough. This loss of tenderness may be reduced or prevented if electrostimulation is applied.

If electrostimulation is applied prior to the occurrence or completion of rigor mortis the electric current leads to muscle contractions which result in a fast exhaustion of energy rich phosphate and a fast decrease of the pH. This accelerates the completion of the rigor mortis. If cooling takes place later on then there is no loss of tenderness.

During the slaughtering of animals it is desirable that stabbing of the carotid artery takes place as short as possible after the stunning which results in the loss of consciousness. The time available for this in many countries has been defined by law and is only a few minutes in case of electric stunning. In many jurisdictions, further slaughter operations in the time period between stunning and clinical death which occurs after bleeding, which time period can be established by means of an electro encephallogram, are not permitted to be performed.

Electric stimulation for the first time is found in literature in U.S. Pat. No. 2,544,681. All publications dealing with electric stimulation start from the idea that electric stimulation has to be applied after the existence of the clinical death. In other words, it has been generally accepted by those skilled in the art that electric stimulation should be applied after clinical death of the animal. The present invention has achieved surprising results by applying electric stimulation prior to clinical death, which goes against generally accepted teachings in the art.

It is often difficult to apply electric stimulation in existing slaughter houses. The apparatus necessary for the electric stimulation of the carcass of a recently killed animal requires space. In existing slaughter houses this space is not available between the place where the stabbing is performed and the place where further operations, such as slaughtering operations, are done, or where the preparations for slaughtering such as dehiding takes place. In the prior art, electric stimulation accordingly has been applied at the end of the slaughtering line upon the pieces of the animal which are obtained after the animal has been slaughtered and cut up, and then of course one has to apply a higher energy because of the amount of time that typically elapses before slaughtering is completed and electric stimulation is applied.

To apply electric stimulation immediately after the killing or later on in the slaughtering line leads to a hygienic problem as well and to problems relating to safety. The electrodes may become dirty and contaminate the meat and they can form a risk for the personal in the slaughter house.

In a live animal blood circulation functions normally as does the nerve system.

It is generally accepted in the art of electric stunning that while an animal is still living, electric currents can lead to muscle contractions of a violent nature, causing wild muscle movements resulting in internal bleedings and bone breakage in the event that the electric stunning is done incorrectly.

The knowledge collected about electric stimulation of meat of the already killed animal gave those skilled in the art the opinion that electric stimulation is only preferred after an animal has been completely killed (resulting in clinical death), but then as fast as possible and with a relatively small amount of energy.

One purpose of this invention is to provide a method avoiding the problems existing with respect to electric stimulation.

According to the invention this is achieved in that the electric current is guided through the animal during at least part of the time period following the stunning and ending with the clinical death of the animal. This invention proceeds contrary to the teachings of the prior art by applying electrical stimulation to influence the tenderness of meat while an animal is still alive.

Surprisingly it appears that the application of electrical stimulation during the time in which the animal has lost its consciousness but is not yet clinically dead also results in a decrease of the pH which is different in dependence of the type of the animal, an improved quality of the meat can be obtained and the disadvantageous results of undesirable muscle contractions does not occur with an animal which has completely lost its conscience. Muscle contractions of this type should not be confused with muscle movements which may happen during the bleeding of the animal.

In accordance with the present invention, the animal should be completely stunned, accordingly the animal should have completely lost its consciousness. An excellent stunning is a first condition for this but this now can be reached with the automatic stunning devices as for instance described in the published Dutch patent application No. 7705519 and the not-prepublished Dutch patent application No. 7904935. In said stunning devices one can operate with a much higher voltage in the order of magnitude of 700 to 800 Volt than with electric stunning devices operated by hand. The stunning time can be short in the order of magnitude of one second and experiments with EEG-diagrams teach that the loss of consciousness is complete and is not formed by suspended consciousness manifested in the form of laming under full consciousness.

If electric stimulation is applied in the phase lying between stunning and clinical death, stimulation can be done in the period lying between the stunning and the stabbing of the carotid artery. This then can be done after stunning while the animals still are present within the conveying device and with the same electrodes which performed the stunning. Alternatively, other electrodes may be used. As a rule for this electric stimulation one will operate with much lower voltages and during a time which forms a multiple of the before mentioned short time necessary for the stunning. One can operate with electrical currents which would normally create muscle contractions but no damaging contractions will result if electrical stimulation is applied in accordance with the present invention.

In case the electric stimulation is performed within the conveying device then the electrodes meant for the stunning, even if they perform a different electrical program are less suitable because they ensure a direct passage of the current through the brains. For the stimulation the current should pass through the main portion of the body. According to the invention one then can make use of the electrodes meant for the stunning provided one considers them together as one single electrode engaging the head and another electrode is brought in engagement with the back side. This may be an electrode automatically moving downwardly against the back of the animal as soon as the electric program of the stunning is finished and from which the signal is derived for moving downwardly the rear electrodes and switching on of the stimulation program.

One also can make use of the conveying device itself by manufacturing it from conductive material and locally placing it under tension due to which a passage of current can take place in transverse direction through the animal over the main part of the length of the animal. The conveying devices in a known manner comprise plates which are interconnected like chain links. If said conveying devices are made with plates of conductive material insulated with respect to each other at the pivot points then it is possible without danger for other not yet stunned animals to apply the required stimulation current in that portion of the conveying device holding the animal after it has been stunned. One also can operate with electrodes where one is applied against the body from the top and the other from below.

In accordance with the invention however the electric stimulation also can take place during the stabbing and/or bleeding which means that the stimulation starts as soon as one stabs and continues during a shorter or longer part of the bleeding time. One can do this by means of electrodes to be applied in a convenient manner which electrodes are operated automatically or by hand. It then is important whether the stunned body is connected to a chain and suspended vertically by means of the chain or that the stunned body is placed horizontally upon a conveying device and stabbed then. Stabbing devices having a tubular knife which is stabbed in the carotid artery are know. A tubular knife will at the same time provide for the discharge of the blood through hoses connected to it towards a collecting reservoir. Such a tubular stabbing device can from the one electrode whereas the other electrode can be formed for instance by the chain from which the animal is suspended or by a conductive part in the conveying device.

The other electrode can be formed by the conveying device if stabbing takes place while the animal is present within the conveying device.

One also can make use of another electrode placed upon or into the rear end of the animal.

According to the invention electric stimulation still can be performed during and/or immediately after bleeding. The electric stimulation then does not occur during the stabbing but after the stabbing and is finished before the empty bleeded animal is dead as well.

Said clinical death only occurs a few seconds or even minutes after the bleeding.

If electric stimulation is applied during the stabbing and/or during the bleeding and/or immediately after the bleeding then the bleeding itself is improved as well and an after-bleeding takes place if the electric stimulation takes place after the normal bleeding. This is due to muscle contractions pressing empty the veins.

The voltages, current intensities and frequencies as well as the time that electrical stimulation is applied are different for each type of animal and can be defined by means of normal experiments.

With a method according to the invention the large advantage is obtained that no additional space is necessary in the slaughter line. According to the invention electric stimulation preferably takes place within the conveying device and following the stunning. The time necessary for the electric stimulation may make it necessary to increase the length of the conveying device. However towards the entrance conventional slaughter houses in general have sufficient space.

I claim:

1. Method of influencing by means of an electric current the quality, in particular the tenderness, of the meat of a slaughter animal, comprising the step of passing the electric current through the animal during the time period following complete stunning so that the animal has completely lost consciousness, and prior to the clinical death of the animal.

2. Method according to claim 1 wherein the electric current is passed through the animal prior to the stabbing of the carotid artery of the animal.

3. Method according to claim 1 wherein the electric current is passed through the animal during stabbing or the bleeding.

4. Method according to claim 2 in which the animal to be slaughtered during the stunning is held by endless conveying devices defining a V-shaped passage between the opposite parts of the endless conveying devices running in synchronism and conveying in the same direction wherein the electric current is passed through the animal during its stay within the conveying device.

5. Method according to claim 4 in which the stunning takes place by means of an electric current which through electrodes passes through the head of the animal to be stunned wherein the electric current for influencing the quality of the meat is passed through the animal immediately after the stunning and with the same electrodes.

6. Method according to claim 4 in which the stunning takes place by means of electrodes extending downwardly into the V-shaped passage of the conveying device and engaging the head of the animal which electrodes are movable in the direction of transportation of the conveying device wherein the electric current for influencing the quality of the meat immediately after the stunning is passed through the animal according to its longitudinal direction by means of one or more of the electrodes used during stunning and a third electrode to be placed in the passage upon the rear end of the animal.

7. Method according to claim 4 in which the stunning takes place by means of electrodes engaging the head of the animal wherein the electric current for influencing the quality of meat is passed in transverse direction through the animal through the two opposite parts of the conveying device.

8. Method according to claim 3, in which a hollow knife is used for stabbing the carotid artery of the animal which hollow knife has been connected to a blood collecting device wherein the electric current for influencing the quality of the meat is passed through the animal by means of the stabbing tube acting as one single electrode towards another electrode to be paced upon the body of the animal.

9. Method according to claim 8, wherein the electrode engaging the body of the animal is formed by the conveying device.

10. Method according to claim 8, wherein the other electrode is placed upon or within the rear end of the animal.

11. A method for influencing the tenderness of meat through electrical stimulation comprising the step of:
passing electrical current through an animal promptly after the animal has been completely stunned so that the animal has completely lost consciousness, and prior to death of the animal.

12. The method of claim 11, wherein the step of passing electrical current through the animal is initiated prior to bleeding the animal.

13. The method of claim 11, wherein the step of passing electrical current through the animal occurrs during bleeding.

14. A method for influencing the tenderness of meat through electrical stimulation comprising the steps of:
holding an animal in a V-shaped restrainer;
passing electrical current through the animal after the animal has been stunned and prior to bleeding the animal;
maintaining the flow of electrical current while the animal is being held in the V-shaped restrainer for a sufficient period of time to influence the tenderness of meat obtained by slaughtering the animal.

* * * * *

UNITED STATES PATENT AND TRADEMARK OFFICE
CERTIFICATE OF CORRECTION

PATENT NO. : 4,561,149

DATED : December 31, 1985

INVENTOR(S) : Johan W. Nijhuis

It is certified that error appears in the above-identified patent and that said Letters Patent is hereby corrected as shown below:

Column 2, line 29, change "personal" to -- personnel --.

Column 3, line 32, after "program" insert a comma.

Column 4, line 4, change "know." to -- known. --; line 7, change "from" to -- form --; line 55 (line 2 of claim 3), after "during" insert -- the --.

Column 5, line 28 (line 7 of claim 8), change "paced" to -- placed --.

Signed and Sealed this

Eighth Day of July 1986

[SEAL]

Attest:

DONALD J. QUIGG

Attesting Officer

Commissioner of Patents and Trademarks